United States Patent
Horton et al.

(10) Patent No.: US 7,422,272 B2
(45) Date of Patent: Sep. 9, 2008

(54) MODULAR UNDERBODY FOR A MOTOR VEHICLE

(75) Inventors: Frank A. Horton, Rochester Hills, MI (US); Gianfranco Gabbianelli, Troy, MI (US); Richard D. Ashley, Gaylord, MI (US); David Cumming, Royal Oak, MI (US)

(73) Assignee: Magna International Inc., Ontario (CA)

(*) Notice: Subject to any disclaimer, the term of this patent is extended or adjusted under 35 U.S.C. 154(b) by 0 days.

(21) Appl. No.: 11/868,994

(22) Filed: Oct. 9, 2007

(65) Prior Publication Data
US 2008/0023953 A1 Jan. 31, 2008

Related U.S. Application Data

(62) Division of application No. 10/494,938, filed as application No. PCT/US02/36177 on Nov. 12, 2002, now Pat. No. 7,325,866.

(60) Provisional application No. 60/331,186, filed on Nov. 9, 2001.

(51) Int. Cl.
*B62D 21/07* (2006.01)
*B62D 21/15* (2006.01)

(52) U.S. Cl. .................. 296/205; 296/29; 280/785; 280/792

(58) Field of Classification Search .............. 180/311; 280/781, 785, 792; 296/29, 203.01, 203.02, 296/203.03, 203.04, 205
See application file for complete search history.

(56) References Cited

U.S. PATENT DOCUMENTS 2,058,580 A 10/1936 Evans
2,108,215 A 2/1938 Stief et al.
2,544,525 A 3/1951 Cadwallader (Continued)

FOREIGN PATENT DOCUMENTS

EP 291385 A1 11/1988

(Continued)

OTHER PUBLICATIONS

International Preliminary Examination Report issued in Internatinoal Applicaiton No. PCT/US02/36177, Jan. 23, 2006.

*Primary Examiner*—D. Glenn Dayoan
*Assistant Examiner*—Paul A Chenevert
(74) *Attorney, Agent, or Firm*—Pillsbury Winthrop Shaw Pittman LLP

(57) ABSTRACT

A module for a frame for a motor vehicle and a method of forming a frame assembly with a pair of laterally spaced, longitudinally extending central side rail structures includes, in one embodiment, using a pair of tubular hydroformed side rail members and a laterally extending connecting structure connected between the pair of side rail members to secure the pair of side rail members in laterally spaced, fixed relation to one another. Each first portion of the pair of side rail members extending longitudinally and each second portion of the pair of side rail members extending laterally relative to the respective first portion and each second portion having an end being constructed and arranged to form a joint with a portion of a respective central side rail structure such that the end of each of the pair of side rail members extends generally laterally through a side of the respective central side rail structure.

7 Claims, 12 Drawing Sheets

U.S. PATENT DOCUMENTS

| | | |
|---|---|---|
| 2,551,528 A | 5/1951 | Darrin |
| 2,788,983 A | 4/1957 | Barenyi |
| 2,935,335 A | 5/1960 | Muller |
| 3,088,750 A | 5/1963 | Schilberg |
| 3,129,954 A | 4/1964 | Duero |
| 3,162,478 A | 12/1964 | Richards |
| 3,176,786 A | 4/1965 | Seidl |
| 3,264,010 A | 8/1966 | Pierce |
| 3,791,472 A | 2/1974 | Tatsumi |
| 4,386,792 A | 6/1983 | Moore |
| 4,557,519 A | 12/1985 | Matsuura |
| 4,582,357 A | 4/1986 | Nakamura |
| 4,881,756 A | 11/1989 | Kumasaka |
| 4,973,103 A | 11/1990 | Imajyo |
| 5,860,694 A | 1/1999 | Seefried |
| 5,954,390 A | 9/1999 | Kleinhoffer |
| 6,003,898 A | 12/1999 | Teply |
| 6,003,935 A | 12/1999 | Kalazny |
| 6,010,182 A | 1/2000 | Townsend |
| 6,092,865 A | 7/2000 | Jaekel |
| 6,099,039 A | 8/2000 | Hine |
| 6,120,059 A | 9/2000 | Beckman |
| 6,126,219 A | 10/2000 | Wilkinson |
| 6,183,013 B1 | 2/2001 | Mackenzie |
| 6,302,478 B1 | 10/2001 | Jaekel |
| 6,540,286 B2 | 4/2003 | Takemoto |
| 6,811,211 B2 | 11/2004 | Saito |
| 6,817,657 B2 | 11/2004 | Watanabe |
| 2001/0002760 A1 | 6/2001 | Gabbianelli |
| 2002/0162224 A1 | 11/2002 | Gabianelli |
| 2003/0189358 A1 * | 10/2003 | Watanabe et al. ...... 296/203.02 |
| 2005/0035586 A1 | 2/2005 | Martin |

FOREIGN PATENT DOCUMENTS

| | | |
|---|---|---|
| FR | 80906 E | 7/1963 |
| JP | 02120189 A | 5/1990 |
| JP | 02200580 A | 8/1990 |
| JP | 05077762 A | 3/1993 |
| JP | 06064558 A | 3/1994 |
| WO | 9419227 A1 | 9/1994 |
| WO | 02070322 | 9/2002 |

* cited by examiner

MODULAR UNDERBODY FOR A MOTOR VEHICLE

CROSS-REFERENCE TO RELATED APPLICATIONS

This application is a Divisional application under 35 U.S.C. § 121 of co-pending U.S. application Ser. No. 10/494,938. U.S. application Ser. No. 10/494,938 entered the U.S. National Stage under 35 U.S.C. §371 on May 7, 2004 now U.S. Pat. No. 10/494,938 based upon International Application PCT/US02/36177 filed on Nov. 12, 2002. International Application PCT/US02/36177 claims priority under the Paris Convention to U.S. Provisional Application No. 60/331,186, filed on Nov. 9, 2001. The entire contents of each of these applications are incorporated herein by reference.

BACKGROUND

This disclosure is related to structural frames. In particular, an illustrated embodiment relates to frames for motor vehicles. Frames for automobiles are commonly made with a pair of side rails that extend the entire length of the automobile. Thus, automobiles of different length will have side rails of different lengths. Thus, side rails for one automobile may not be capable of being used for other automobiles of a different length or size. Also, automobile frames are often entirely formed of stamped components that result in high manufacturing costs, especially when attempting to increase frame integrity.

The illustrated embodiment of this disclosure addresses these problems as well as other problems.

SUMMARY

Aspects of this disclosure provide a frame for a motor vehicle that includes a pair of laterally spaced, longitudinally extending central side rail structures, each of the central side rail structures having a top and a side; a pair of tubular hydroformed first side rail members, each of the first side rail members being connected at a first joint to a first end portion of a respective one of the central side rail structures such that a second portion of each of the first side rail members extends generally laterally through the side of the respective central side rail structure; and a pair of second side rail structures, each of the second side rail structures being connected at a second joint to a second end portion of a respective one of the central side rail structures, one of each of the respective central side rail structures, first side rail members, and second side rail structures forming one of a pair of laterally spaced side rail assemblies, and a laterally extending connecting structure connected between the side rail assemblies and being constructed and arranged to hold the side rail assemblies in laterally spaced relation to one another.

This disclosure also provides module for a frame for a motor vehicle, the frame including a pair of laterally spaced, longitudinally extending central side rail structures, the module comprising a pair of tubular hydroformed side rail members, each of the pair of side rail members having a first portion and a second portion; and a laterally extending connecting structure connected between the pair of side rail members to secure the pair of side rail members in laterally spaced, fixed relation to one another; each of the first portions of the pair of side rail members extending longitudinally and each of the second portions of the pair of side rail members extending laterally relative to the respective first portion, each of the second portions of the pair of side rail members having an end being constructed and arranged to form a joint with a portion of a respective central side rail structure such that the end of each of the pair of side rail members extends generally laterally through a side of the respective central side rail structure and such that the laterally extending ends extend laterally in opposite directions.

This disclosure also provides a method of forming a frame assembly comprising providing a pair of laterally spaced, longitudinally extending central side-rail structures, each having a top and a side; forming a pair of tubular hydroformed first side rail members by a method comprising, providing a tubular metallic blank having a tubular metallic wall, placing the tubular metallic blank into a die cavity of a die assembly, the die cavity having die surfaces, and providing a high pressure fluid into an interior of the blank to expand the metallic wall of the blank outwardly into conformity with the surfaces of the die cavity to define a longitudinally extending first portion and laterally extending second portion; connecting the longitudinally extending first portions together with a laterally extending connecting structure constructed and arranged to hold the longitudinally extending first portions in a laterally spaced relation; and mounting each laterally extending second portion to a respective central side rail member such that the laterally extending second portion extends generally laterally through the side of the respective central side rail structure.

Other aspects, features, and advantages of aspects and embodiments of this disclosure will become apparent from the following detailed description of the illustrated embodiment, the accompanying drawings, and the appended claims.

DETAILED DESCRIPTION

Figure 1:
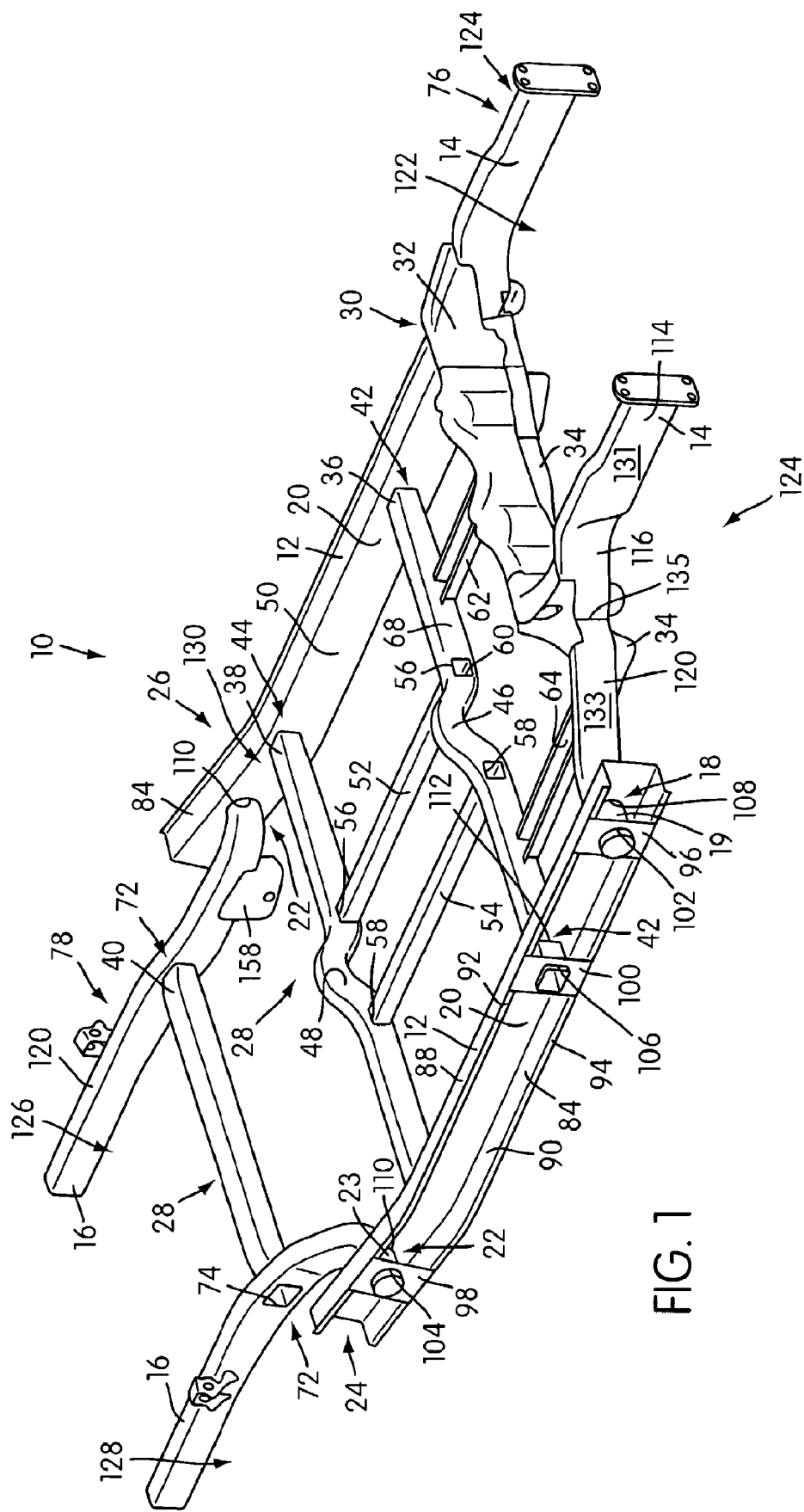
FIG. 1 shows a perspective view of an illustrated embodiment of a vehicle frame constructed according to the principles of this disclosure.
Figure 2:
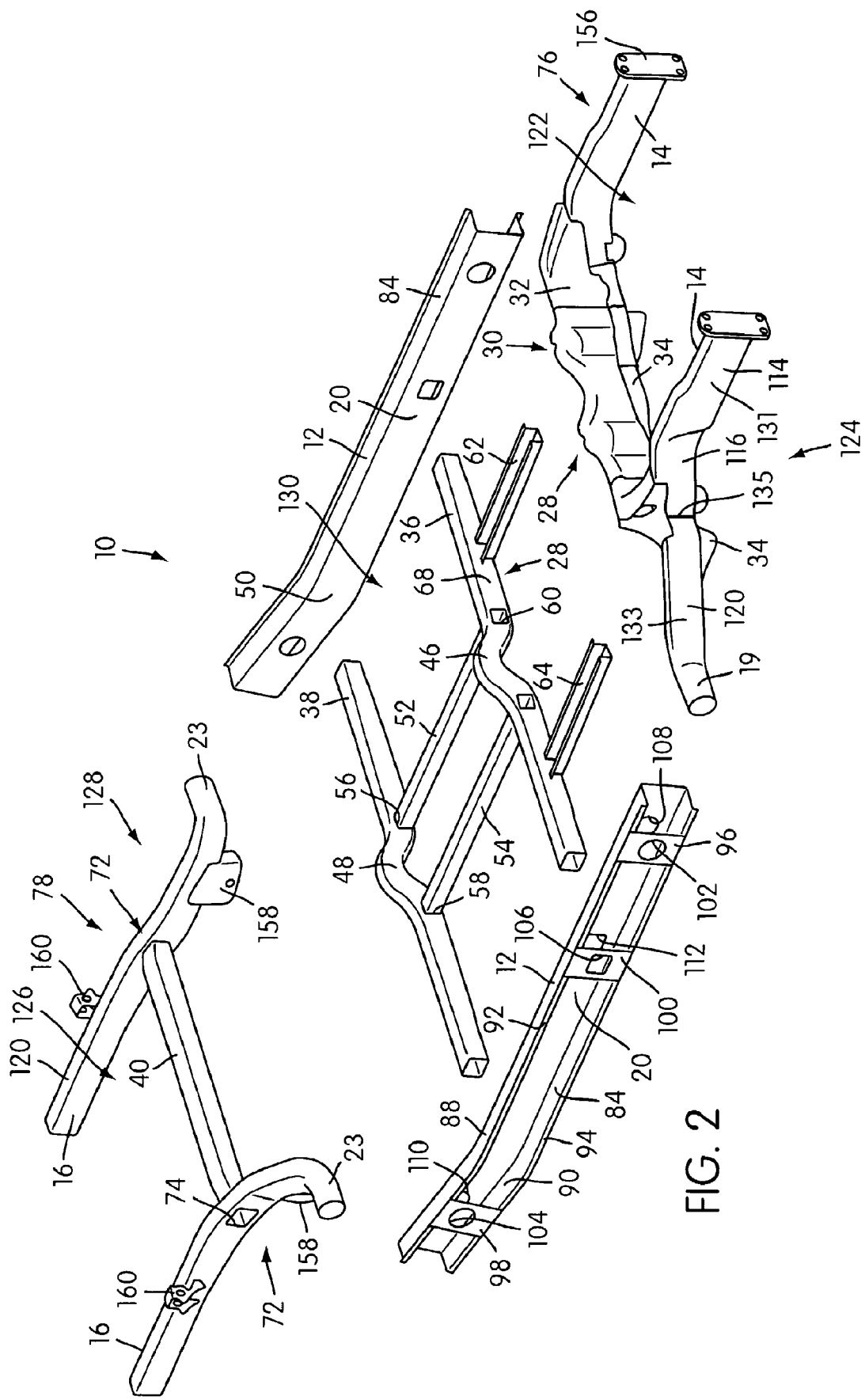
FIG. 2 shows the vehicle frame of FIG. 1 in partially exploded view.

FIG. 1 shows an illustrated embodiment of a modular underbody frame 10 for a motor vehicle constructed according to the principles of this disclosure. The FIG. 2 shows the frame 10 in partially exploded view. The frame 10 includes a pair of laterally spaced, longitudinally extending central side rail structures 12, a pair of forward side rail structures forming a front module 76, and a pair of rearward side rail structures forming a rearward module 78.

The use of modules 76 and 78 with central side rail structures 12 permits great versatility in forming frame 10 and in using these components for forming other frames. For example, the modules 76 and 78 may be used together or separate in the manufacturing of other frames with other central side rail structure configurations. Thus, the use of modules 76 and 78 may achieve great savings in the inclusion of the modules 76 and 78 into other motor vehicle frames. Additionally, the modules 76 and 78 can be used with differently sized central side rail structures merely by relocating the position of the joints connecting modules 76 and 78 with the central side rail structures 12 or by using the modules 76 and 78 with central side rail members of shorter of longer lengths.

As seen in the illustrated embodiment of FIG. 1, the central side rail structures 12 are both mirror image construction to one another, but are identified by the same reference numeral 12 for convenience. The pair of forward side rail structures are provided by a pair of tubular hydroformed forward side rail members 14. The rearward side rail structures are provided by a pair of tubular hydroformed rearward side rail members 16. The members 14 are of mirror image construction to one another and the members 16 are of mirror image construction to one another, but are referred to by identical reference numerals, respectively, to facilitate discussion of aspects of this disclosure.

The central rail structures 12 each provide a rocker panel structure as structure 164, as discussed below, on each side of the frame 10. The pair of tubular hydroformed forward side rail members 14 are each connected at a forward joint 18 (only one forward joint is shown in the drawings, but the other is of mirror image construction to joint 18) to a forward end portion of a respective central side rail structure 12. A rearward portion 19 of each forward side rail member 14 extends generally laterally through a side 20 of a respective central side rail structure 12.

Each rearward side rail member 16 is connected at a rearward joint 22 (the joints being of mirror image construction and being designated with identical reference numbers for convenience of discussion) to a rearward end portion of a respective central side rail structure 12. A relatively straight, laterally extending forward portion 23 of each rearward side rail member 16 extends generally laterally through the side 20 of an associated central side rail structure 12 at joint 22. The joints 18 and 22 are of similar construction in the example frame 10 and are considered in a detail below.

The central side rail structure 12, the forward side rail member 14 and the rearward side rail member 16 on each side of the frame 10 comprise one of a pair of laterally spaced side rail assemblies 24, 26. Laterally extending connecting structure, generally designated 28, is connected between the side rail assemblies 24, 26 and holds the side rail assemblies 24, 26 in laterally spaced relation to one another.

The laterally extending connecting structure 28 includes one or more stamped sheet metal structures 30 connected between the forward side rail members 14. The sheet metal structures 30 include an upper dash support structure 32 and a lower dash support structure 34. Each structure 32, 34 may be of single or multi-piece stamped sheet metal construction and is connected by welding or other suitable method between the pair of forward side rail members 14. The structures 32, 34 support a portion of a dashboard assembly (not shown) in the assembled vehicle.

The laterally extending connecting structure 28 also includes a pair of intermediate cross members 36, 38 and a rear cross member 40. The pair of intermediate cross members 36, 38 are connected between intermediate portions of the pair of central side rail structures 12. The intermediate cross member 36 is connected between the rail structures 12 at a pair of joints 42 (which are of mirror image construction to one another). The intermediate cross member 38 is connected to the pair of rail structures 12 at joints 44 (only one of which is visible in the figures, but which are of mirror image construction to one another). The intermediate cross members 36, 38 in the example frame 10 are each constructed of a metal material of suitable strength such as a suitable grade of steel and each has a generally tubular construction. Each intermediate cross member 36, 38 may be formed by tubular hydroforming, for example, by roll forming and seam welding, or by any other suitable method. Each member 36, 38 has an upwardly arching central section 46, 48 to accommodate a portion of the transmission (not shown) of an assembled the vehicle.

The construction of joints 42 is considered below. The joints 44 connecting the second intermediate cross member 38 to the central side rail structures 12 are formed by securing each end of the member 38 to an inwardly facing surface 50 of each central side rail structure 12 by welding or by other appropriate method.

A pair of longitudinally extending central support members 52, 54 are connected between the first and second intermediate cross members 36, 38 at joint pairs 56 and 58, respectively. Joints 56 and 58 are identical to one another in the example vehicle frame 10. Consequently only one of the joints 56 is considered in detail. A pair of openings 60 are formed in opposing wall portions of the intermediate cross member 36 and an end portion of the central support member 52 is secured therein by welding or by other suitable method. Each central support member 52, 54 is constructed of a metal material of suitable strength such as a suitable steel and has a generally tubular construction. Each member 52, 54 may be formed by roll forming and seam welding, for example, by hydroforming, by extrusion, or by any other suitable method.

A pair of longitudinally extending forward support members 62, 64 are each secured between the first intermediate cross member 36 and a respective end of the lower dashboard support structure 34. Each support member 62, 64 is constructed of a metal material of suitable strength such as a suitable grade of steel which has been shaped by stamping or other appropriate method to have a generally C-shaped cross section. A rearward end of each forward support member 62, 64 is secured to a forwardly facing surface 68 of the cross member 36 by welding or other appropriate method. A forward end (not shown) of each forward support member 62, 64 is secured to an intermediate portion of the lower dashboard support structure 34 by welding or other appropriate method.

The rearward cross member 40 is secured between intermediate portions of the rearward side rail members 16 at joints 72. The rearward cross member 40 is constructed of a metal material of suitable strength such as a suitable grade of steel and has a generally tubular construction. The cross member 40 may be formed by hydroforming, by roll forming and seam welding, or by extrusion, for example, or by any other suitable method. The joints 72 are similar to the joints 56. Specifically, a pair of openings 74 are made in generally opposing portions of each rearward side rail member 16 and an end section of the rearward cross member 40 is secured in a respective pair of openings by welding or other appropriate method.

FIG. 2 shows a partially exploded view of the frame of FIG. 1 to illustrate the modular construction of the frame 10. Specifically, the frame 10 includes the front module 76 and a rearward module 78. The front module 76 includes the pair of forward side rail members 14 and the connecting structure 32, 34 connected between the rail members 14 to secure the forward side rail members 14 in laterally spaced, fixed relation to one another. Each forward side rail member 14 includes the laterally extending rearward end portion 19 constructed and arranged to form the forward joint 18 with a forward end portion of a respective central side rail structure 12 such that the rearward portion 19 of each forward side rail member 14 extends generally laterally through a side 20 of the respective central side rail structure 12.

Similarly, the rearward module 78 includes the pair of laterally spaced, rearward side rail members 16 and the cross-member 40 connected between the rearward side rail members 16 to secure the rearward side rail members 16 in laterally spaced, fixed relation to one another. Each rearward side rail member 16 has a laterally extending forward end portion 23 constructed and arranged to form the rearward joint 22 with a respective central side rail structure 12 such that the forward portion 23 of each rearward side rail member 16 extends generally laterally through a side of the respective central side rail structure 12.

Figure 3:
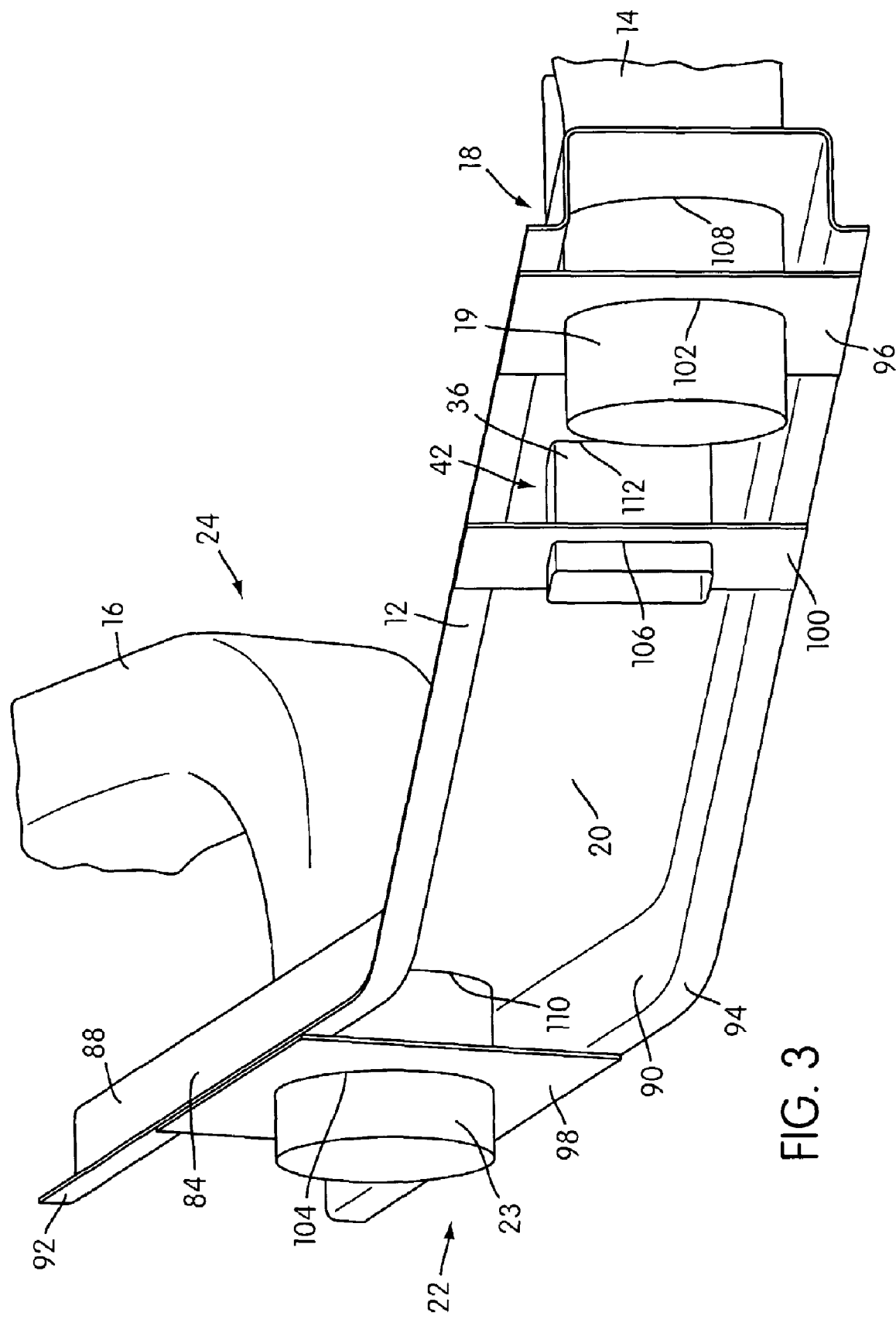
FIG. 3 is an enlarged view of a side rail element of the vehicle frame showing a plurality of frame components assembled thereto.

One of the central side rail structures 12 is shown in enlarged view in FIG. 3. Each central side rail structure 12 of the example frame 10 is provided by a side rail element 84 of stamped sheet metal construction. The side rail element 84 has a generally C-shaped open transverse cross-section that includes the vertically extending side wall portion 20 and an upper and a lower wall portions 88, 90, respectively, extending outwardly from upper and lower edges respectively of the side wall portion 20. Upper and lower flanges 92, 94 extend generally vertically upwardly and downwardly, respectively, from the outer edges of the upper and lower wall portions 88, 90, respectively.

The construction of the joints 18, 22 and 42 can be understood from FIG. 3. The joints 18, 22, 42 are of generally similar construction to one another. Each joint 18, 22, 42 includes a side support member 96, 98, 100, respectively. Each side support member 96, 98, 100, is connected between the upper and lower wall portions 88, 90 of the side rail element 84 at a position laterally outwardly spaced from the vertical wall portion 20 thereof. The side support member 96, 98, 100 of each joint 18, 42, 22, respectively, has a respective opening 102, 104, 106 and the vertically extending wall portion 20 of the side rail elements 84 has three corresponding openings 108, 110, 112, respectively. Each forward joint 18 is formed by securing the laterally extending rearward portion 19 of each forward side rail member 14 in the associated pair of openings 108, 102. Each joint 42 is formed by securing an end portion of the intermediate cross member 36 in the associated pair of openings 106, 112. Each rearward joint 22 is formed by securing the laterally extending forward portion 23 of each rearward side rail member 16 in the associated pair of openings 104, 110. Each side rail element 84 and each side support member 96, 98, 100 is constructed of a metal material of suitable strength such as an appropriate grade of steel and are secured together by welding or any other appropriate means. In the example frame 10, each side support member 96, 98, 100 may be welded to a portion of a respective flange 92, 94.

Each forward side rail member 14 includes a longitudinally extending forward section 114, an angular intermediate section 116 and the laterally extending, essentially straight rearward portion or section 19. Each rearward side rail member 16 includes a longitudinally extending rearward section 120 and the forward laterally extending, essentially straight forward portion or section 23. The forward sections 114 of the front module 76 generally define an engine compartment area 122 and the sections 114 and 116 generally define a wheel well area 124 on each side of the front of the vehicle frame 10. The rearward module 78 generally defines a rear cargo compartment area 126 and a pair of rear wheel well areas 128. The portion of the frame 10 between the central side rail structures 12 generally defines a passenger compartment area 130 of the frame 10.

In the example frame 10, each forward side rail member 14 is of two-piece tubular hydroformed construction. The member 14 includes a first forward hydroformed member 131 and a second forward hydroformed member 133. The members 131, 133 are connected to one another at joint 135. Joint 135 may be formed by telescopically interengaging portions of the hydroformed members 131 and 133 and securing them together by welding, although any other appropriate joining method may be used.

Figure 4:
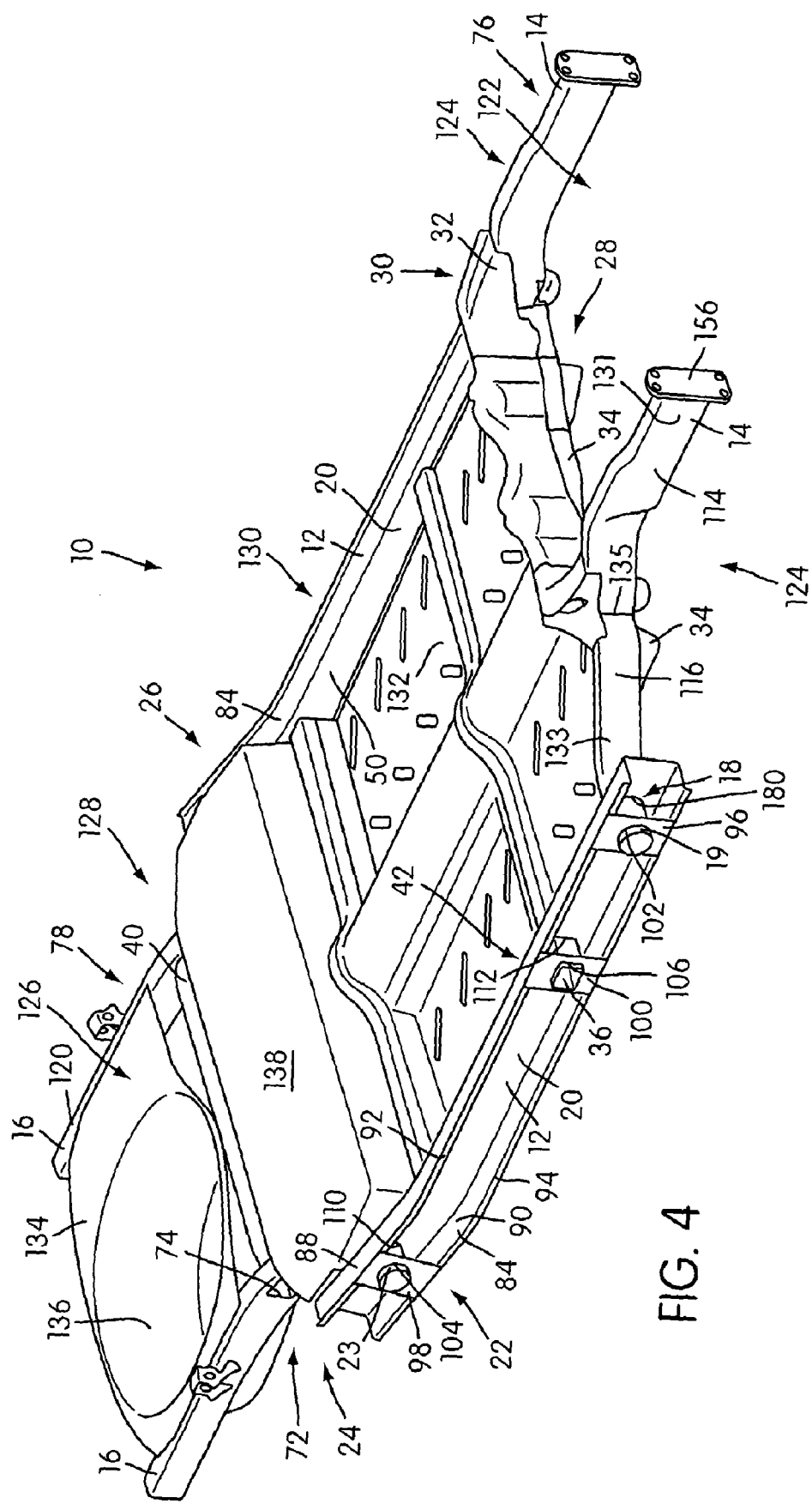
FIG. 4 is a view of the frame similar to the view of FIG. 1 except showing a plurality of sheet metal structures mounted to the frame.

FIG. 4 shows the frame 10 of FIG. 2 with a plurality of sheet metal structures attached thereto. A floor panel 132 is secured to portions of the laterally extending connecting structure 28 and to the side rail structures 12 and provides a floor structure in the passenger compartment area 130 of the frame 10. The floor panel 132 may be of single or multi-piece stamped sheet of construction and may be secured to the frame by any suitable method such as, for example, by welding. A rear panel structure 134 is secured in the cargo compartment area 126 of the frame 10. The rear panel structure 134 may be a stamped sheet metal construction and may be secured to portions of the rearward side rail members 16 and the laterally extending cross structure 28 by welding, although any suitable method may be used for securing. The rear panel structure 134 defines a central recess 136 for storing a spare tire. A second floor pan structure 138 (which may serve as a seat riser to support a seat or seats in the passenger compartment of the assembled vehicle) is secured to the frame 10 in a rear portion of the passenger compartment area 130. The floor pan structure 138 may be of stamped sheet metal construction and may be secured to the frame 10 by welding or by any other suitable method.

Figure 5:
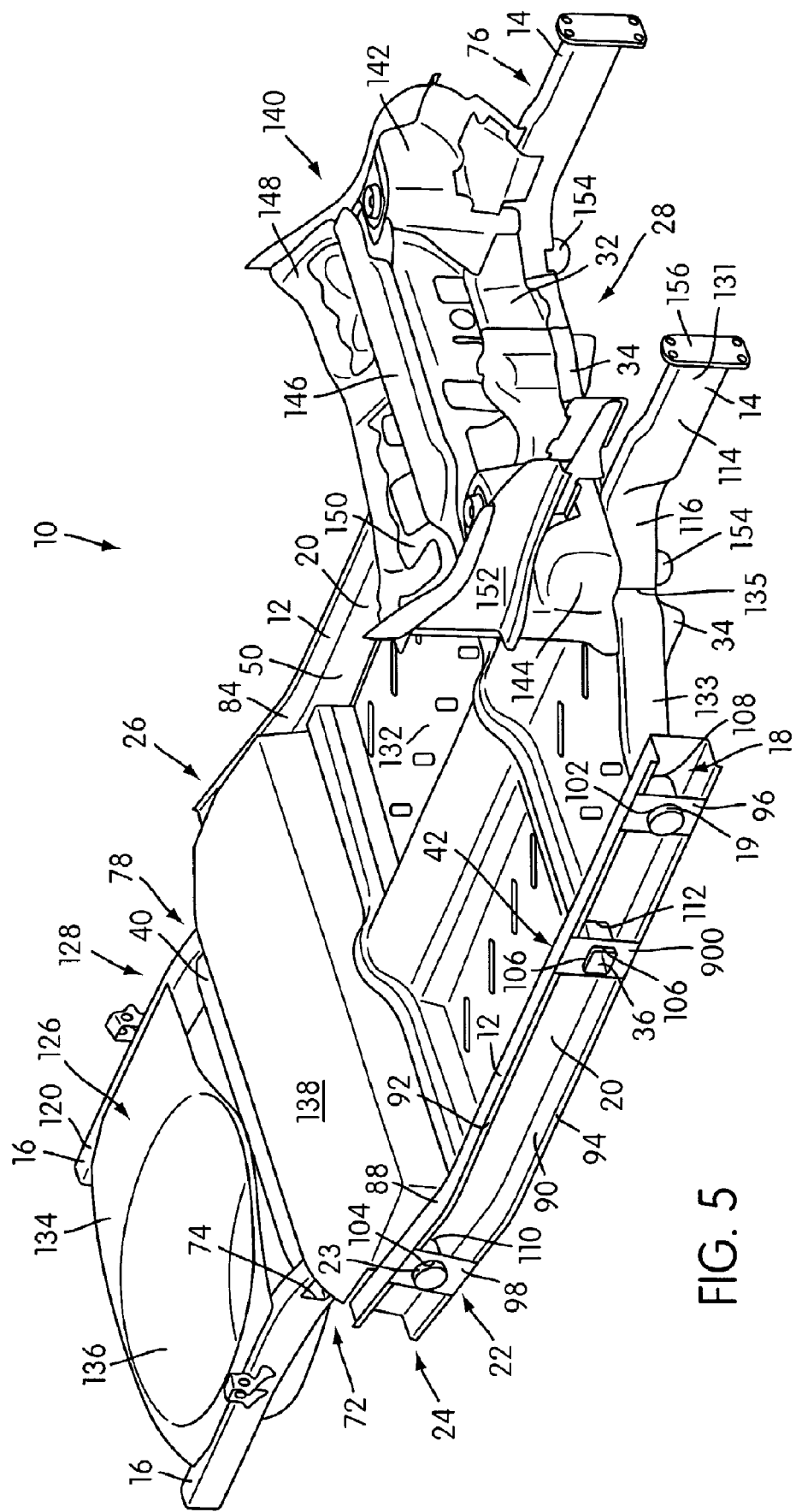
FIG. 5 is a view similar to the view of FIG. 4 except showing a front end assembly mounted on the frame.

FIG. 5 shows the frame 10 of FIG. 4 with a front end assembly 140 secured thereto. The example front end assembly 140 of the frame 10 is an assembly of the stamped sheet metal structures that are secured to one another by welding or other appropriate method. The front end assembly 140 generally provides a firewall between the engine compartment area 122 and the passenger compartment area 130 and provides support for and points of attachment for various other structures (not shown) of the vehicle including, for example, the vehicle dashboard, the front windshield, the vehicle front suspension, various body panels and hang-on body parts (such as front fenders and hood) and so on.

The front end assembly 140 generally includes a pair of shock tower structures 142 for mounting the vehicle front suspension, a dashboard panel support structure 144, a plenum structure 146, a plenum upper reinforcement structure 148, and a lower plenum support structure 150. A pair of inner support arms 152 are mounted on the front end assembly 140 and extend generally forwardly therefrom. The support arms 152 provide support structure for various portions of the assembled vehicle including, for example, in front fenders (not shown) of the vehicle. A cradle attachment bracket 154 is mounted on a lower portion of the front module 76 and a front bumper mounting bracket 156 is mounted on a forward end of each forward side rail member 14.

A rear suspension attachment bracket 158 and a rear spring attachment bracket 160, as seen in FIG. 2, is secured to each rearward side rail member 16 of the rearward module 78. A rear bumper mount (not shown) of similar construction to the front mounts 156 may be mounted to the end of each rearward side rail member 16.

A pair of body side panel structures 162 (only one of which is shown, see FIG. 6, for example) of stamped sheet metal construction may be mounted on a respective side of the frame 10 of the assembled vehicle. Each body side panel structure 162 may be of conventional construction and may be shaped to include lower rail-forming structure generally, designated 164, and one or more pillar structures 166. Each body side panel structure 162 is mounted on a respective side of the frame 10 of the assembled a vehicle such that (a) the lower rail-forming structure 164 thereof is secured to a respective side rail element 84 (as shown in cross section in FIG. 7, for example) and such that (b) each of the plurality of pillar structures 166 extends upwardly from an associated side rail assembly 22, 24. The body panel structure 162 generally defines a rear fender portion 170, a fuel tank access opening 172, a roof rail portion 174, a B pillar portion 176, a pair of door openings 178, 180, a front fender structure 182 and a rocker panel forming (or rail forming) structure 164. The rocker panel structure 164 includes a plurality of portions having generally C-shaped cross-sections. This construction can be appreciated from FIG. 7. The side rail element 84 and the rail forming structure 164 secured thereto cooperate to form a rocker panel having a closed transverse cross section on a respective side of the frame 10. More specifically, the rail forming structure 164 of each body side panel structure 162 includes a C-shaped portion and a pair of upper and lower flanges 186, 188 extending generally vertically therefrom. The flanges 186, 188 may be secured by welding or other appropriate method to the flanges 92, 94 of the associated side rail element 84, respectively, in the assembled vehicle.

Figure 8:
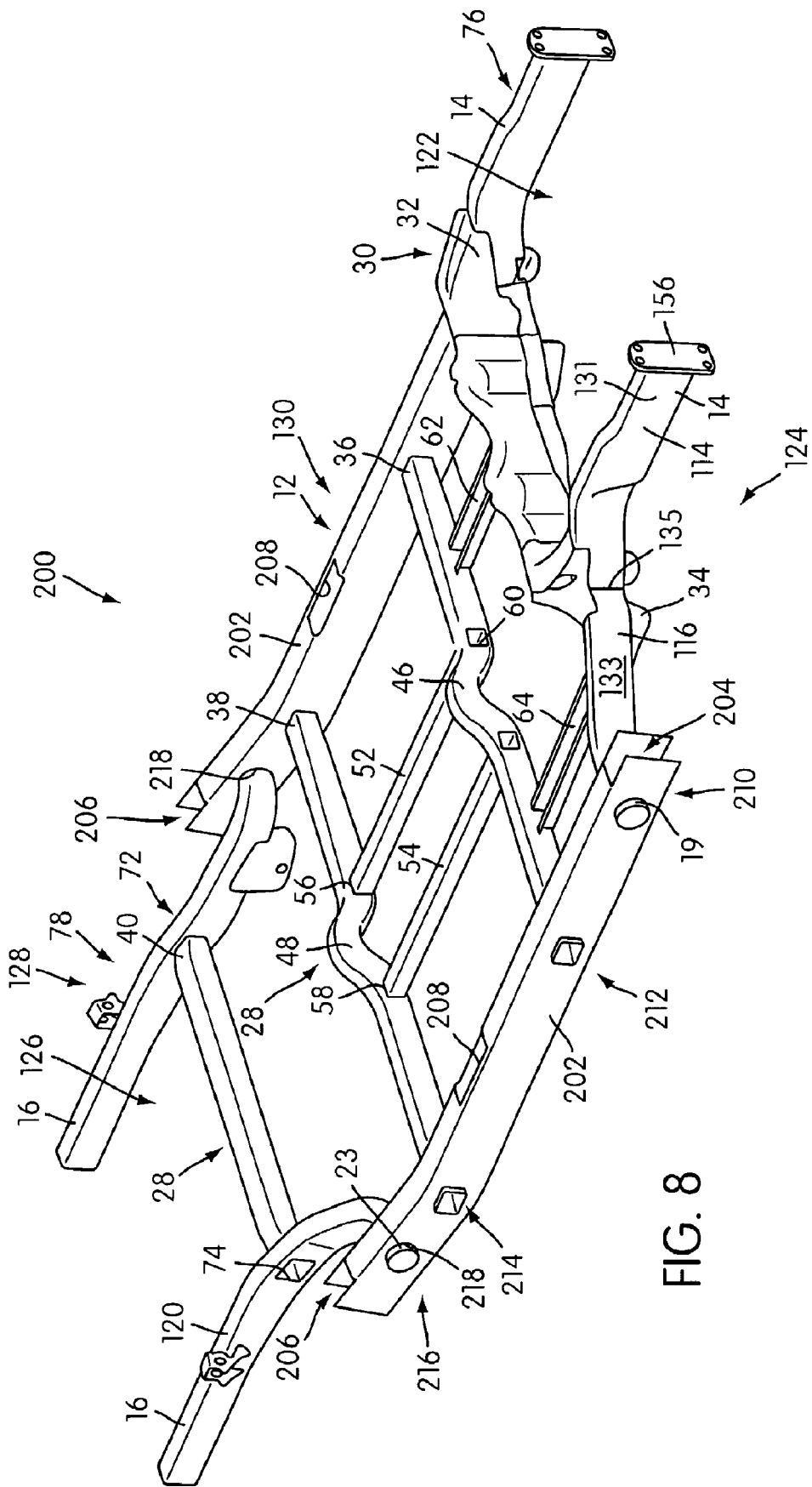
FIG. 8 is another illustrated embodiment of a vehicle frame constructed according to the principles of this disclosure.

Another example frame 200 is shown in FIG. 8. The frame 200 is identical to the frame 10 as shown in FIG. 1, except that the central side rail structures 12 of the frame 200 are provided by a pair of tubular hydroformed central side rail members 202 of mirror image construction to one another. Because the tubular hydroformed central side rail members 202 are of mirror image construction, they are designated by the same reference number for convenience. Portions of the frame 200 that are identical to portions of the frame 10 are identified with identical reference numbers and are not described further.

Each member 202 is of one-piece construction and has a generally rectangular cross-section. A plurality of wall portions of each member 202 have been cut out (by laser cutting or other appropriate method) and removed to form a plurality of openings in each member 202. Specifically, upper and lower wall portions on each end of each hydroformed member 202 has been removed to form a notch 204, 206, respectively at each end of each hydroformed member 202. An upper wall portion has been removed from each member 202 to form a central opening 208 in each member 202. A plurality of pairs of openings have been formed in the pairs of vertical side walls of each member 202 to form joints 210, 212, 214, 216. The joints 210, 212, 214, and 216 are of similar construction to one another so only joint 216 is considered in detail. Joint 216 is formed by cutting openings 218 in the vertical sides of each side rail member 202 sized to receive the laterally extending forward portion 23 of each rearward side rail member 16. The laterally extending forward portions 23 are inserted into respective pairs of openings 218 and secured within the openings 218 by welding or other appropriate method.

Figure 9:
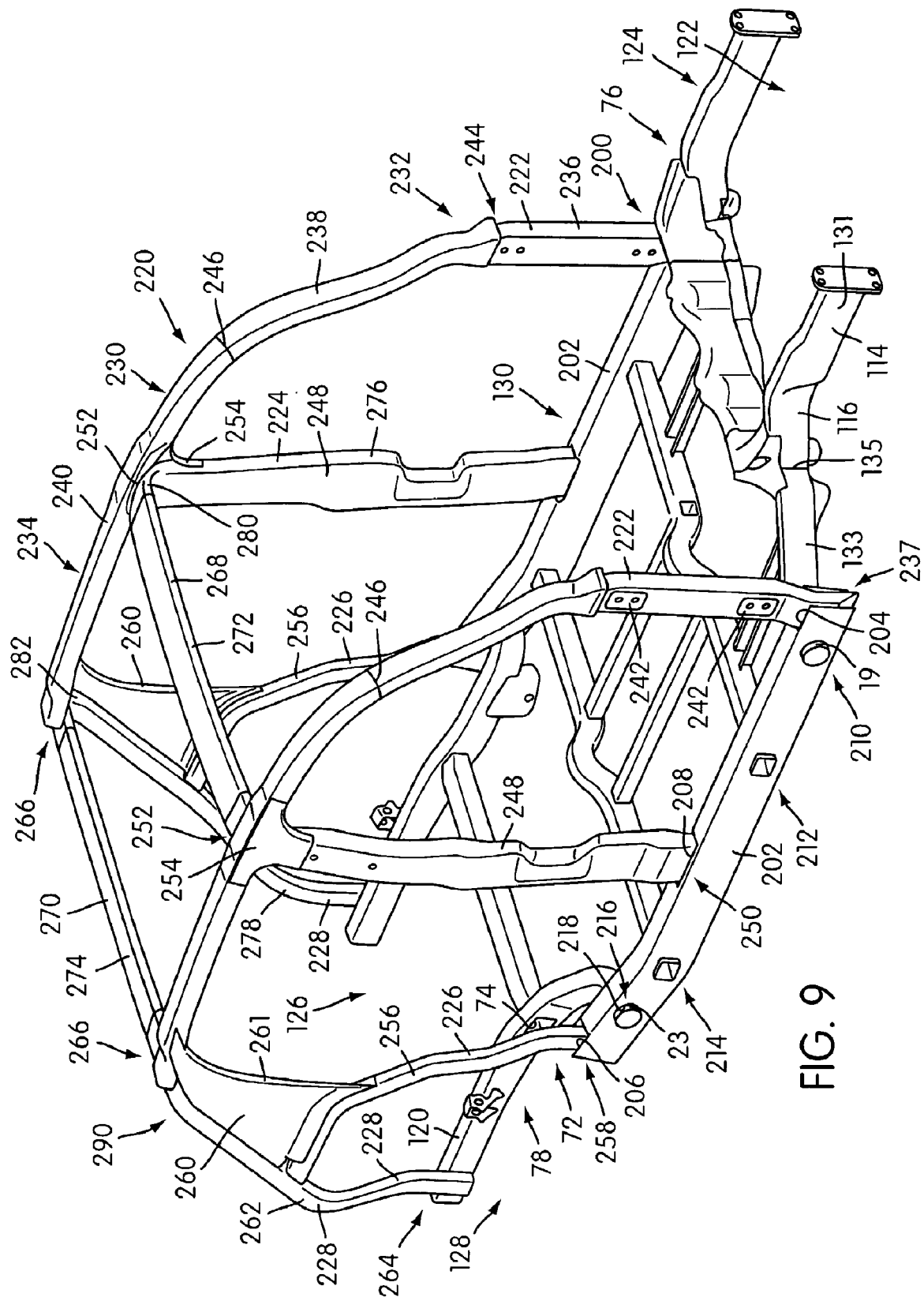
FIG. 9 is a view similar to the view of FIG. 8 except showing an upper frame assembly mounted thereto.

FIG. 9 shows the frame 200 with an upper frame assembly 220 mounted thereon. The upper frame assembly 220 includes a pair of A pillars 222, a pair of B pillars 224, and a pair of C pillars 226 mounted on respective central side rail structures 202 and a pair of rearward-most or D pillars 228. Each rearward-most pillar 228 is mounted on a respective rearward side rail structure 16. The upper frame assembly 220 of the example frame 200 includes a pair of tubular hydroformed upper longitudinal members 230 (of mirror image construction to one another), each having a pillar-forming portion 232 and a rail-forming portion 234.

The pillar-forming portion 232 of each upper longitudinal member 230 includes an tubular hydroformed A pillar member 236 that is secured within the notch 204 at a joint 237 of the central side rail structure 202 on a respective side of the frame 200. Each A pillar member 236 extends upwardly from the respective side rail member 202 and forms an A pillar 222 on the associated side of the frame 200. The rail-forming portion 234 of each upper longitudinal member 230 includes a pair of hydroformed rail members 238, 240. The rail-forming portion 234 of each upper longitudinal member 230 extends rearwardly from the pillar-forming portion 232 thereof to define a roof supporting rail on a respective side of the frame 200.

Each pillar member 236 includes a pair of hydroformed hinge mounting structures 242 for mounting the hinges of a vehicle door (not shown). The members 236, 238, 240 are secured to one another at joints 244 and joints 246. The joints 244 and 246 may be formed by telescopically interengaging the respective hydroformed members and securing them together by welding or other suitable method.

The pair of B pillars 224 are provided by a pair of tubular hydroformed B pillar members 248 (of mirror image construction to one another). A lower portion of each B pillar member 248 is secured to an intermediate portion of a respective central side rail structure 202 at joint 250 and extends upwardly therefrom. An upper portion of each B pillar member 248 is secured to the rail-forming portion 234 of an associated upper longitudinal member 230 at joint 252. Each pillar member 248 may be secured to the associated upper longitudinal member 230 at joint 252 by welding the members to one another in surface-to-surface relation. The joint 250 this formed by securing (by welding or other appropriate means) a lower end of the pillar member 248 in the opening 208 of the side rail member 202. A door seal interface structure 254 is mounted in the vicinity of joint 252 for receiving a door seal in the assembled vehicle as taught in commonly assigned U.S. patent application Ser. No. 09/725,457 of Gabbianelli et al., filed on Nov. 30, 2000 which application is hereby incorporated into the present application in its entirety for all material therein.

The C pillars are provided by a pair of tubular hydroformed C pillar members 256. A lower portion of each C pillar member 256 is secured to a rearward portion of a respective central side rail structure 202 at joint 258 (which is similar in construction to joint 237) and extends upwardly therefrom. An upper portion of each C pillar 256 extends rearwardly and is secured to an intermediate portion of an associated rearward-most pillar structure 228. A rear quarter panel structure 260 is secured (by welding or other appropriate method) to the C pillar member 256, the D pillar structure 228 and the rail-forming portion 234 on each side of the frame 200. An edge portion of the panel structure 260 provides a door seal interface surface 261.

The rearward-most pillars 228 of the example frame 200 are provided by a pair of tubular hydroformed D pillar members 262 (of mirror image construction to one another). A lower portion of each D pillar member 262 is secured at joints 264 to a rearward portion of a respective rearward side rail member 16 and extends upwardly therefrom. An upper portion of each D pillar member 262 is secured to a free end of the rail-forming portion 234 of the associated upper longitudinal member 230 at joints 266. Joints 264 are similar in construction to joints 250 and joints 266 are similar in construction to joints 252.

In the example frame 200, the B pillar members 248 and the D pillar members 262 are each provided by a respective tubular hydroformed U-shaped member 268, 270 having a central portion 272, 274 and a pair of leg portions 276, 278 (the leg portions of each pair being of mirror image construction to one another) extending from junctures 280, 282 at the upper ends of the leg portions. The leg portions 276, 278 are mounted on the respective central portions 272, 274 such that the junctures 280, 282 are positioned at respective ends of the central portions 270, 274. A free end of each leg portion 276 is secured to a respective central side rail member 202. Similarly, a free end of each leg portion 278 is secured to the respective rearward side rail member 16 and extends upwardly therefrom to form the pair of rearward-most pillar structures. An intermediate portion of each upper longitudinal member 230 is secured through a juncture 280 of the first U-shaped member 268. A free end portion of the rail-forming portion 234 of each upper longitudinal member 230 is secured to a respective juncture 282 of the second U-shaped member 270.

Each U-shaped assembly 268, 270 may, alternatively, be of one-piece construction (not shown) or may be of multi-piece construction (as shown). When multi-piece construction is used, the leg portions and the central portions of each U-shaped member 268, 270 may be separate tubular hydroformed pieces that are assembled to one another after hydroforming.

Figure 10:
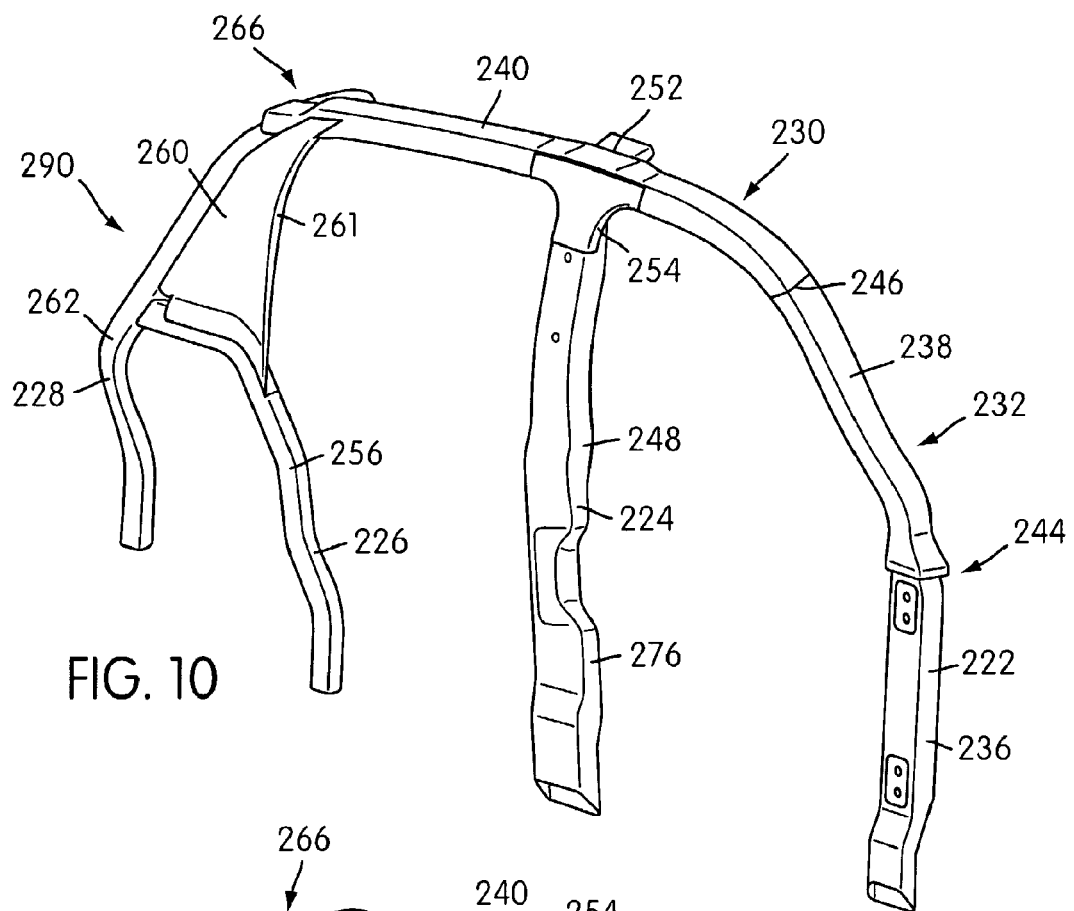
FIG. 10 is a perspective view of a side assembly module for use with the frame of FIG. 8.
Figure 11:
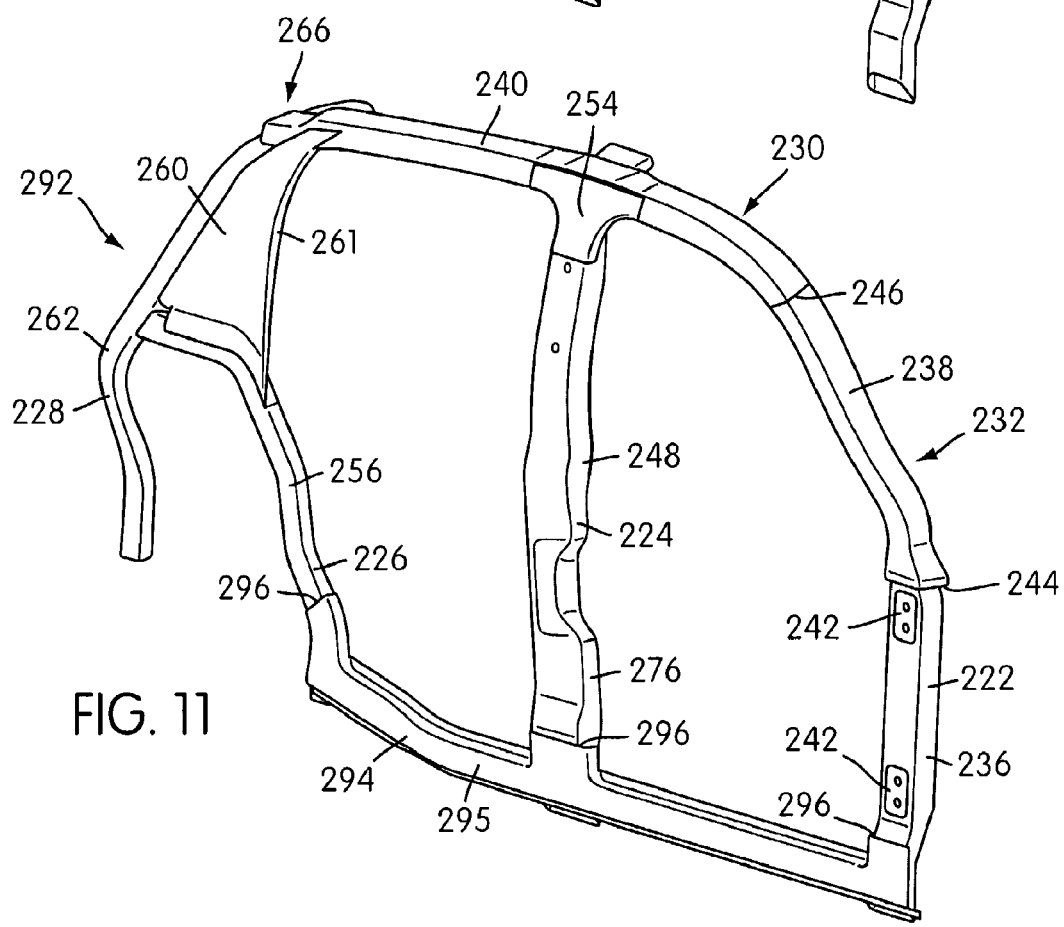
FIG. 11 is a view similar to FIG. 10 of another side assembly module.

Hydroformed components of the upper frame assembly 220 maybe pre-assembled into a tubular hydroformed side assembly module 290 (see FIG. 10) prior to mounting on the frame 200. Another example of a side assembly module 292 is shown in FIG. 1. The side assembly module 292 is identical to the side assembly module 290 except that the side assembly module 292 includes a rocker panel outer structure 294 which is secured to the bottom portions of the A, B and C pillar members 236, 248, 262 and which may be of stamped sheet metal construction. The rocker panel outer structure 292 includes rail forming structure 295 and defines a plurality of recesses, generally designated 296, shaped to receive the lower ends of the respective pillar members 236, 248, 262. The rail forming structure 295 of the rocker panel outer structure 294 has a generally C-shaped, inwardly opening transverse cross-section.

The structure and the components of each side assembly module 290, 292 provides the vehicle manufacturer with numerous options in both vehicle frame structure and methods of vehicle frame assembly. The side assembly module 290 can be assembled to the frame 200 (see FIG. 8, for example).

Figure 12:
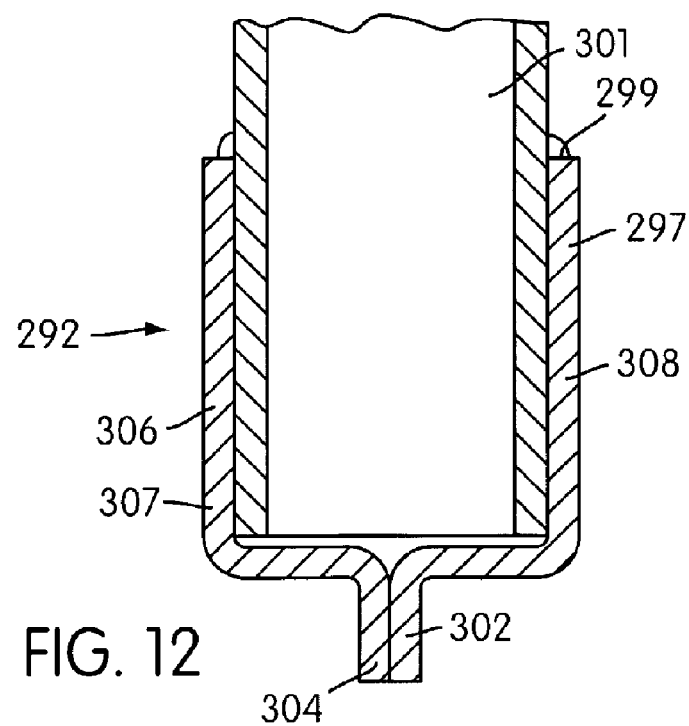
FIG. 12 is a first illustrated embodiment illustrating cross-sectional view through a B-pillar and a connection between a B pillar of a side assembly module and a side rail element secured thereto.

The side assembly module 292 can be assembled to a frame a stamped C-shaped rocker panel similar to the side rail element 84 except that openings have been made therein for mounting the side assembly module 292. This construction can be understood from the cross section of FIG. 12. FIG. 12 shows a cross section through a B pillar of the side assembly module 292 and a stamped sheet metal rocker panel element 297 secured thereto. The element 297 includes a top opening in the form of a notch 299 to receive a tubular hydroformed B pillar 301. In this example, the rocker panel outer structure 294 and the B pillar 301 of the side assembly module 292 are assembled to the element 297 as shown in FIG. 12. The flanges 302 (of a rocker panel outer structure 307), 304 (of the element 297) are by welding or other suitable means and the pillar 301 is secured between the walls 306 (of the rocker panel outer structure 307), 308 (of the element 297) by welding or other suitable means.

Figure 13:
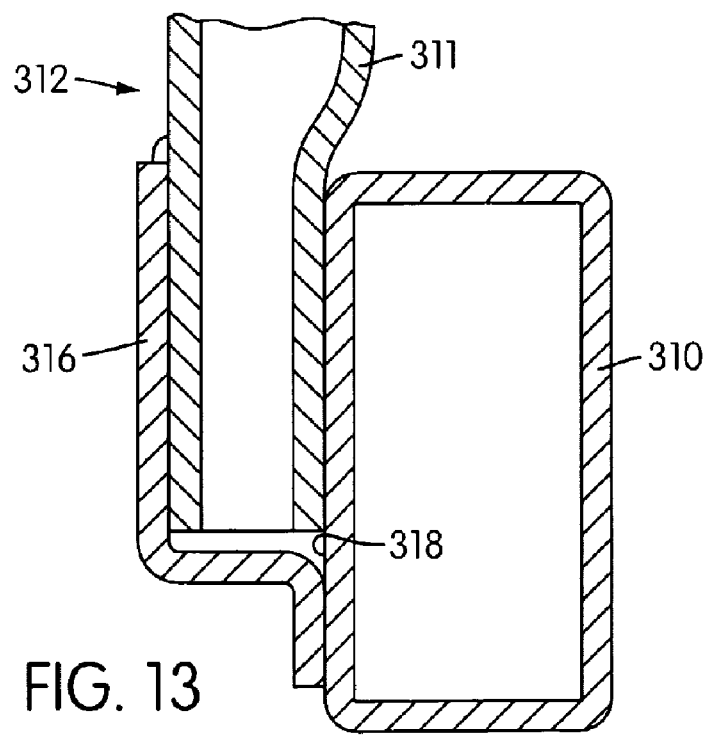
FIG. 13 is a second illustrated embodiment illustrating a cross sectional view through a B-pillar and a connection between a B pillar of a side assembly module and a side rail member secured thereto.

A side assembly module can, alternatively, be constructed as shown in fragmentary cross section in FIG. 13 and assembled to a frame having a tubular hydroformed central rail member 310 in which no openings are made to receive the pillars. FIG. 13 shows a cross section through a B pillar 311 (which may be of tubular hydroformed construction as shown) of a side assembly module 312 and the rail member 310 of a vehicle frame (not shown) secured thereto. In this example, a rocker panel outer structure 316 of the module 312 and a lower portion of the pillar 311 of the module 312 are mounted to a side surface 318 of the rail member 310. The structures 310, 311 and 316 may be secured to one another by welding or other appropriate method.

Figure 6:
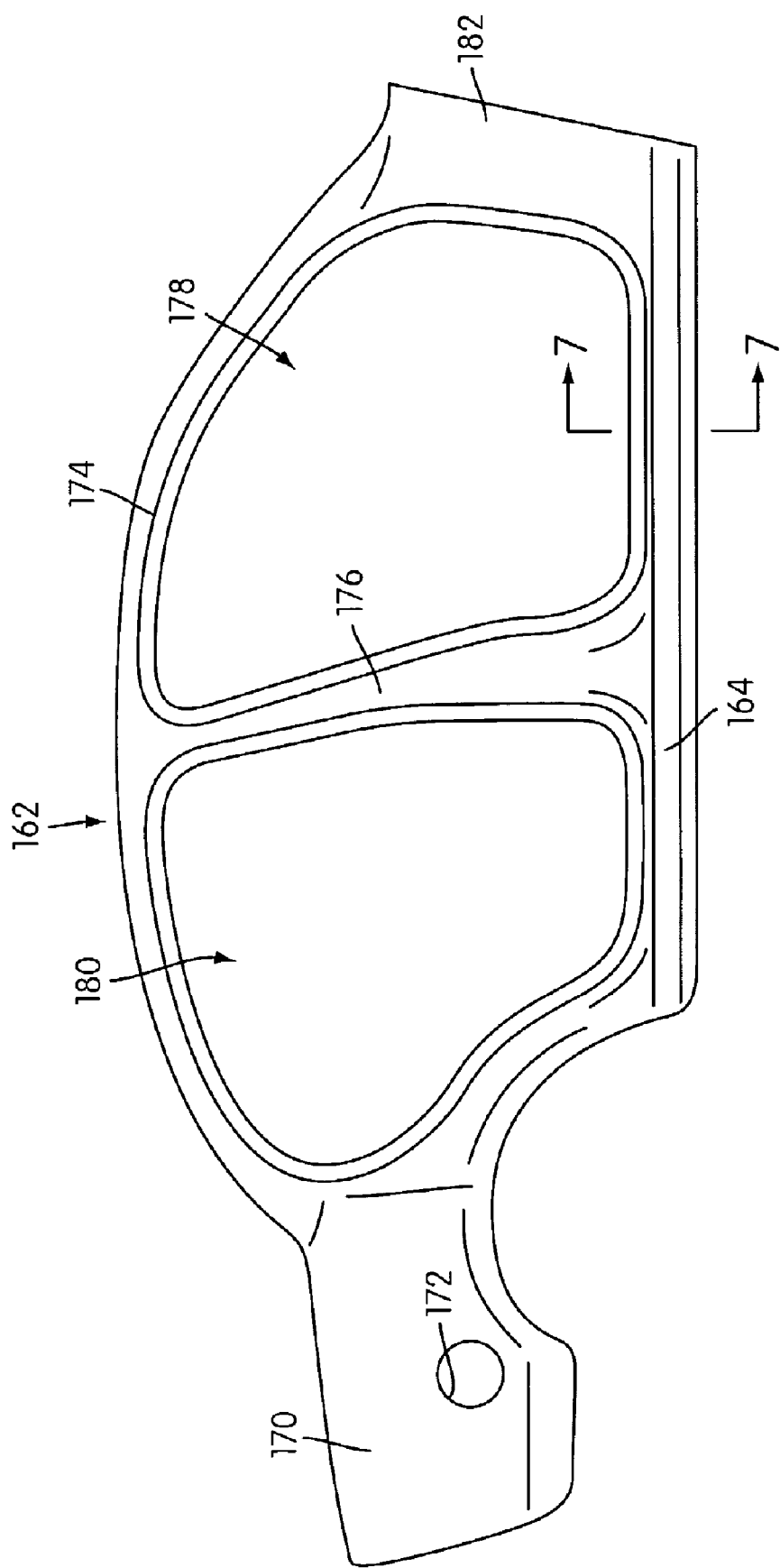
FIG. 6 is an elevational view of a vehicle side body panel structure shown in isolation, which is for use with the illustrated embodiment of FIG. 1.
Figure 7:
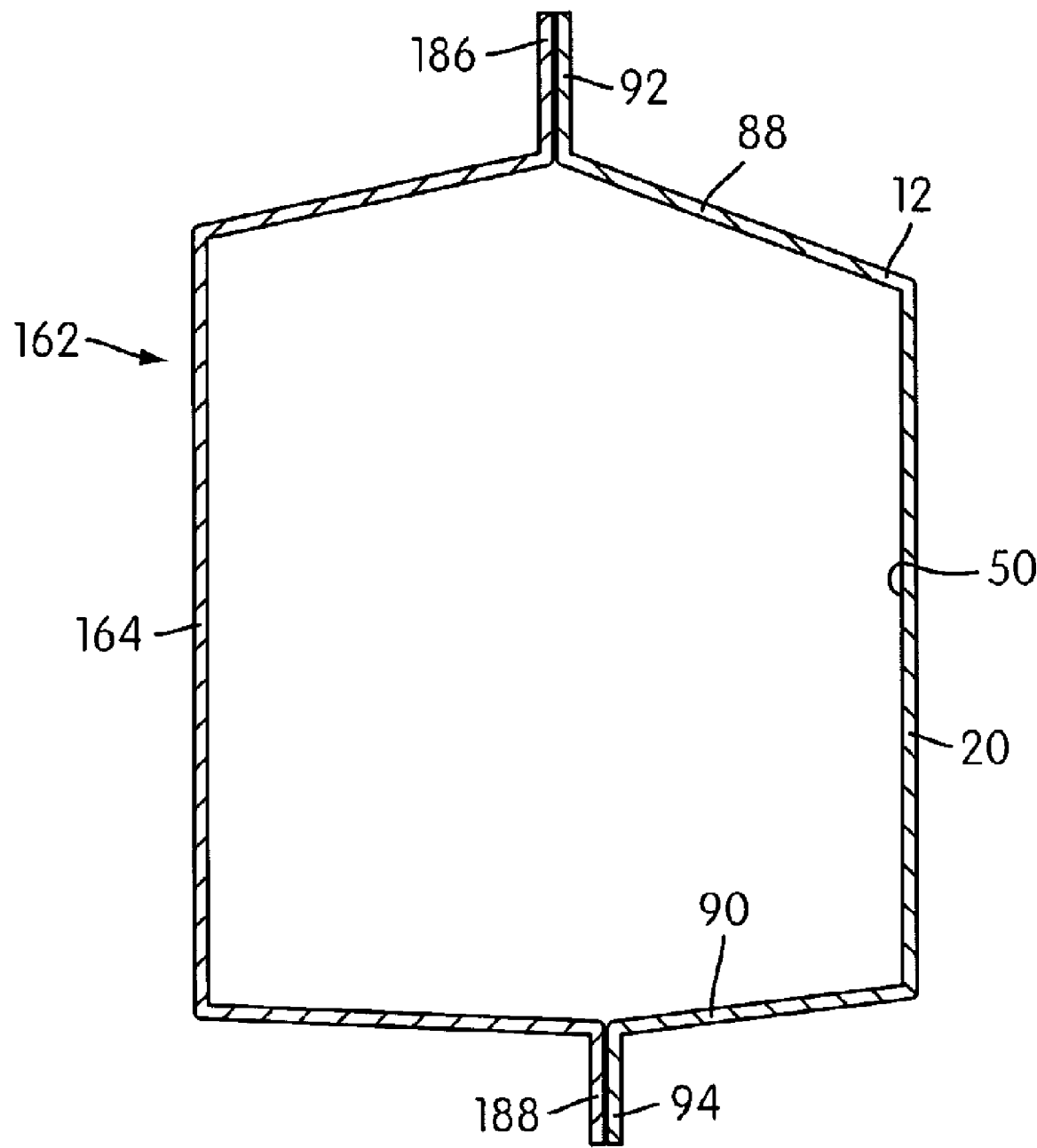
FIG. 7 is a cross-sectional view of the side body panel structure taken through the line 7-7 as indicated in FIG. 6 and showing a cross-sectional view of a portion of a side rail element secured to the side body panel structure.

It should be understood that although vehicle frames and panels have been illustrated for four door vehicles, as in FIG. 6, it is within the scope of this disclosure, however, to construct a modular frame using the concepts illustrated herein for any number of doors, such as for two door vehicles.

Hydroforming Method: Because many of the structural features of each hydroformed member are formed during a hydroforming operation that creates the same, an example method of hydroforming the tubular hydroformed components of each example frame 10, 200 will be considered. A hydroforming operation for forming a tubular hydroformed central side rail member 202 can be understood from FIG. 14.

Tubular hydroforming is a metal-forming process in which a fluid is used to outwardly expand a tubular metal blank into conformity with surfaces of a die assembly cavity to form an individual hydroformed member. A tubular blank can be shaped during the hydroforming process to have a transverse cross-section that varies continuously along its length. Tubular hydroforming enables manufacturers to increase part stiffness, dimensional accuracy, fatigue life, and crashworthiness over non-hydroformed parts (such as stamped parts, for example) while reducing part mass and cost. Hydroformed components have a high strength relative to their mass (as compared to stamped sheet metal components, for example), in part because of the plastic deformation of the wall of the blank which occurs during the hydroforming process. More particularly, the outward expansion of the tubular metallic wall of the blank during hydroforming caused by the fluid pressure within the blank creates a work-hardening effect which uniformly hardens the metallic material of the resulting hydroformed member. Hydroforming also produces less waste metal material than stamping. Hydroformed parts are relatively economical for vehicle manufacturers to produce because the tooling costs associated with hydroforming are typically lower than those associated with other construction methods.

The hydroformed members disclosed can reduce the number of stamped parts used in frame construction by incorporating hydroformed parts into vehicle frames, which reduces manufacturing costs and improves the frame quality.

Figure 14:
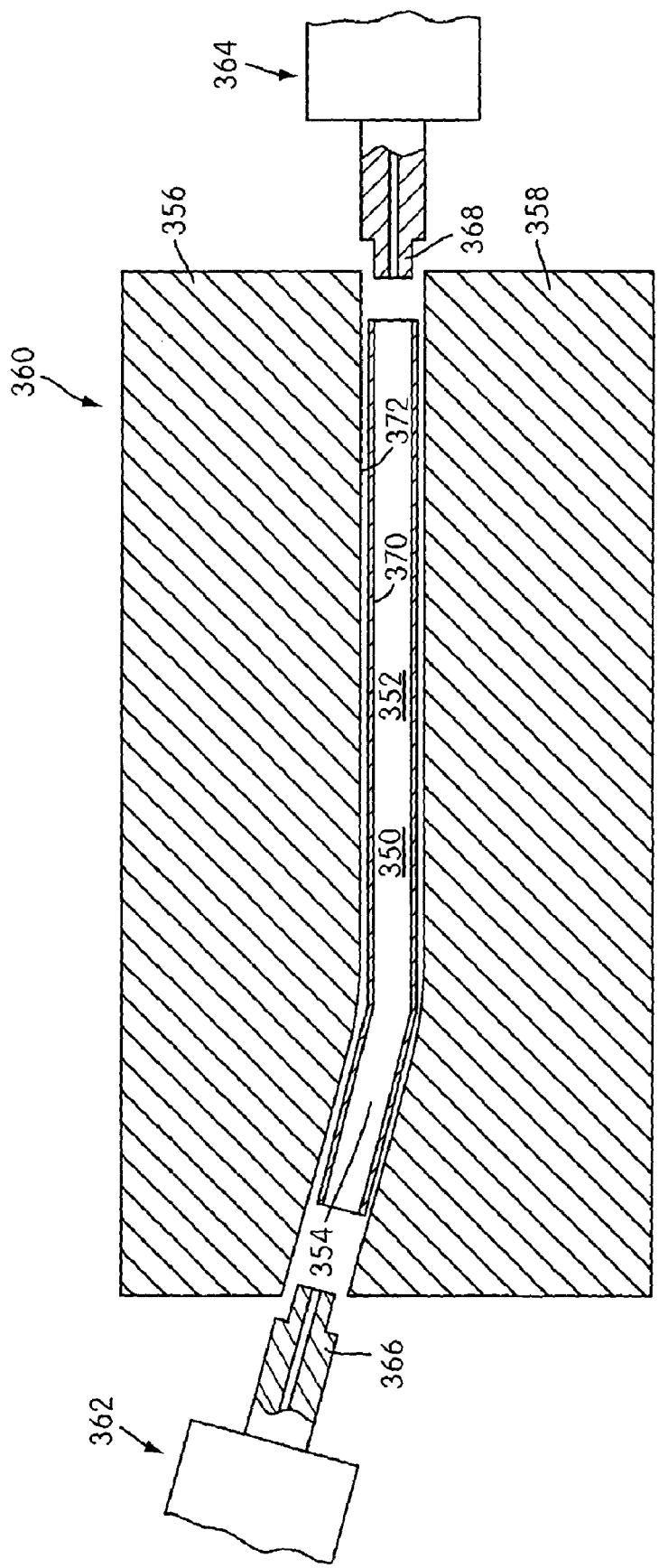
FIG. 14 is a schematic view of a hydroforming die assembly for forming module members for the illustrated embodiments.

Each hydroformed member may be formed from an appropriately shaped tubular blank. An example blank 350 for forming the central side rail member 202 is shown in FIG. 14. The blank 350 is constructed of a suitable metallic material and has a closed transverse cross section and open tubular ends. The example blank 350 is constructed of a suitable grade of material, such as steel. Each blank 350 may be formed by any suitable method. For example, a continuous strip of metallic material may be shaped by roll forming into a tube and then seam welded to have a closed transverse cross section. Alternatively, a continuous length of metallic tubing may be formed by extrusion. The continuous tubular structure may then be cut to the length required to form the blank 350.

The blank 350 may be bent into an angular shape prior to being placed in a hydroforming die assembly. The blank 350 includes a forward portion 352 and a rearward portion 354. The blank 350 may be bent in a computer numeric controlled ("CNC") bending machine prior to being placed in the die assembly or, alternatively, may be bent by stretch bending to achieve the angular shape. If a relatively "sharp" angle (that is, at an angle greater than 30.degree.) is to be formed in a blank, each sharp angle can be formed according the teachings of U.S. Pat. No. 5,953,945 entitled METHOD AND APPARATUS FOR WRINKLE-FREE HYDROFORMING OF ANGLED TUBULAR PARTS, the entire contents of which are incorporated herein by reference. The teachings of the '945 patent reference can be used to avoid wrinkle formation during the bending operation, particularly on the concave portion of each bend in a hydroformed part. A suitable lubricant may be applied to the exterior of the blank 350 prior to placing it in the die assembly.

After bending, the tubular blank 350 is placed between the die halves 356, 358 of a die assembly 360 and the assembly 360 is closed by bringing the two die halves 356, 358 together. The tubular blank 350 is preferably immersed in a fluid bath so that it is filled with hydroforming fluid (not shown in the schematic representation of FIG. 14), or otherwise lubricated. A hydroforming ram assembly 362, 364 is engaged with each end of the tubular blank 350 such that a ram member 366, 368 of each assembly 362, 364 seals a respective end of a tubular blank 350. The ram members 366, 368 include hydraulic intensifiers which can intensify the hydroforming fluid, thereby increasing the fluid pressure of the fluid within the blank 350 to irregularly outwardly expand (or deform) the tubular metallic wall 370 of the tubular blank 350 into conformity with the die surfaces 372 of the die cavity (as disclosed, for example, in the '945 patent reference) to thereby form a hydroformed central side rail member 202 having an exterior surface that is fixed into a predetermined irregular configuration.

The tubular blank 350 may have, for example, an essentially equal diameter, essentially circular cross section along its length prior to outward expansion during the hydroforming process. After hydroforming, the hydroformed member has a cross section that is determined by the shape of the die cavity. The shape of each die cavity used to form the central side rail member 202 thus corresponds to the shape of the exterior surface of the member 202. Altering the cross-sectional configuration of the tubular hydroformed member 202 can be accomplished without departing from the principles of this disclosure, however.

The hydroforming process may be computer controlled. The flow of the hydroforming fluid may be controlled to control, in turn, the manner in which the metallic material of the blank 350 expands (in a radial direction) during the hydroforming process. The ram members 366, 368 may also be controlled to push axially inwardly on opposite ends of the blank 350 during hydroforming to cause metal flow (in an axial direction) within the blank 350 during outward expansion.

The fluid pressure and the axial pressure can be applied and controlled independently of one another. The ends of the tubular blank 350 may be pushed axially inwardly during outward expansion to maintain the wall thickness of the fully formed hydroformed member to within a predetermined range of the wall thickness of the initial tubular blank 350. The ram members 366, 368 may be operated, for example, to maintain the wall thickness of the outwardly expanding wall portions of the blank 350 so that the wall thickness of the resulting hydroformed member is within about +/−10% of the original wall thickness of the blank 350 (i.e., to compensate for wall thinning during diametric outward expansion of the tube).

If holes are to be formed in the member 202, the holes may be formed while the member 202 is in the die assembly 360 during the hydroforming operation or may be formed after the hydroformed member 202 is removed from the die assembly along with any other required further processing of the member 202. Holes may be formed during the hydroforming process in a hydropiercing operation as disclosed, for example, in U.S. Pat. No. 5,460,026, which patent is hereby incorporated by reference in its entirety into the present application. Alternatively, holes (such as holes 208) or notches (such as notches 206) of various sizes and shapes may be cut (using a laser, for example) in the member 202 after the hydroforming operation is completed and the hydroformed component is removed from the die assembly 360.

Variations on the embodiments of the frames 10, 200 and the components thereof are within the scope of this disclosure. For example, a frame could be constructed in which each upper longitudinal member includes a pillar-forming portion and an integral rail-forming portion (i.e., so that each upper longitudinal member has one piece tubular hydroformed construction). It is contemplated, for example, when the entire a pillar and roof rail are provided by a single hydroformed member, to form the upper longitudinal member from a single integral blank or, alternatively, from a blank that is comprised of two tubular metallic structures of different diameter that are welded together end-to-end to form a blank which would then be bent (optionally) and hydroformed. To construct a blank from two tubular structures of different diameter from one another, and one end of a small (or large) diameter blank could be expanded (or reduced) to have a diameter equal to the diameter of the larger (or smaller) diameter blank. The expanded (or reduced) end of the smaller (or larger) diameter tubular structure could then be butt welded to an end of the larger (or smaller) diameter tubular structure to form a two-piece blank that is then bent (optionally) and hydroformed to form a one-piece upper longitudinal member.

Each U-shaped hydroformed portion of the example frame 200 is of three-piece construction (although one piece construction could be used to make each U-shaped member). Specifically, although any appropriate number of elements can be employed, each U-shaped assembly 268, 270 includes three elements (a pair of tubular hydroformed leg members 248, 262 and a tubular hydroformed cross member 272, 274, respectively. The leg members 248 of the first U-shaped assembly 268 may be identical to one another (so that they may be formed in the same hydroforming die assembly) or they may be of mirror image construction to one another. Similarly the leg members 262 of the second U-shaped assembly 270 may be identical to one another or may be of mirror image construction to one another. Each cross member 272, 274 is telescopically interengaged at each end thereof with one leg member of the associated pair of leg members 248, 262 and is secured thereto by welding at joints 390, 392, respectively. It should be noted that each of the hydroformed members of the various frames described herein can be formed as a single, unitary hydroformed member or as a multi-piece hydroformed member having multiple members that are attached to each other by welding or by other appropriate fastening mechanism.

The three piece construction of the U-shaped assemblies 268, 270 allows the hydroformed portion of frame 200, for example, to be easily and economically constructed and to provide frames having a wide range of widths. More specifically, a frame can be made relatively wider by making the cross members 272, 274 (and each of the structures comprising the laterally extending connecting structure 28) relatively longer and a frame can be made relatively narrower by making the cross members 272, 274 relatively shorter (and each of the structures comprising the laterally extending connecting structure 28 relatively shorter). It can be understood that the cross members 272, 274 of each assembly 268, 270 constitute the bight portions of the respective U-shaped assemblies. Each cross member may be essentially straight or slightly arcuate. The length of the cross members 272, 274 define the transverse distance between the B pillars and the D pillars, respectively, and consequently determined the width of the frame. The laterally extending connecting structure 28 can be constructed to have the length required to span the distance between the side rail assemblies.

It should also be understood that in the description of the illustrated embodiments reference to "welding" to couple elements together is only one possible manner of coupling the elements together and that other fastening mechanisms or fasteners can be used instead of or together with welding. Also, it should be understood that the non-hydroformed members discussed herein can be formed of any non-hydroforming process including stamping and other types of processes. The references to "stamping" and to "stamped" sheet metal construction is made since it is a preferred method of manufacturing the non-hydroformed members in the illustrated embodiment. Other types of non-hydroforming processes can be employed, however, in the illustrated-embodiments.

It should be pointed out that although various portions of the frames 10, 200 are referred to as "modular", this characterization is intended to be broadly construed and is not intended to limit the manner in which any of the frames is constructed. It is possible to assemble the front module 76 and the rearward module 78 of each frame 10, 200 and then assemble each frame 10, 200 to include the assembled modules 76, 78. It is contemplated to construct each frame 10, 200 in a number of ways, however, and so it is to be understood that no limitations on the order in which the various hydroformed members and/or sheet metal structures or other structural members are joined together to form each frame are to be inferred by anything shown or stated in the present application.

Thus, it can be appreciated that although the frame 10 in FIG. 2, for example, shows the assembled front and rearward modules 76, 78 thereof in exploded relation with other structures of the frame 10, this representation simply shows that it is possible to completely assemble each module 76, 78 separately before the modules are connected with other frame components to form the frame 10.

It can be understood that the modular approach allows a particular module to be used in the construction of a wide range of frames. For example, a front module of a frame generally defines the engine compartment of the vehicle. Several different front modules can be constructed for use with a particular rearward module to construct frames having different configurations and/or different lengths. A range of front modules can be constructed, for example, to accommodate a wide range of vehicle front body configurations, vehicle lengths and engine sizes. Similarly, the rear module can be reconfigured to provide a range of frame lengths (and thus different vehicle lengths), a variety of vehicle body styles and appearances and a range of storage compartment sizes. It can thus be appreciated that the modular construction of the vehicle frames shown an described herein provides the manufacturer with flexibility in vehicle construction.

It can also be understood that the vehicle frames shown and described herein are examples only that are intended to illustrate various embodiments of this disclosure only and are not intended to limit the scope of the inventive concept. Other embodiments are contemplated.

While this disclosure has been described with reference to a limited number of embodiments, it will be apparent that variations and modifications may be made thereto without departure from the spirit and scope of the inventive concept. Therefore, the following claims are intended to cover all such modifications, variations, and equivalents thereof in accordance with the principles and advantages noted herein.

What is claimed is:

1. A module for a frame for a motor vehicle, the frame including a pair of laterally spaced, longitudinally extending central side rail structures, the module comprising:

a pair of tubular hydroformed side rail members, each of said pair of side rail members having a first portion and a second portion; and a laterally extending connecting structure connected between said pair of side rail members to secure said pair of side rail members in laterally spaced, fixed relation to one another;

each of said first portions of said pair of side rail members extending longitudinally and each of said second portions of said pair of side rail members extending laterally relative to said respective first portion, each of said second portions of said pair of side rail members having an end being constructed and arranged to form a joint with a portion of a respective central side rail structure such that said end of each of said pair of side rail members extends generally laterally through a side of the respective central side rail structure and such that said laterally extending ends extend laterally in opposite directions.

2. The module of claim 1, wherein each tubular hydroformed side rail member comprises a unitary, one-piece member.

3. The module of claim 1, wherein said laterally extending connecting structure includes a unitary, one-piece, tubular hydroformed member.

4. The module of claim 1, wherein each of said laterally extending ends extend outwardly, away from said connecting structure.

5. The module of claim 1, wherein said second portion of each of said pair of side rail members is a rear portion.

6. The module of claim 1, wherein said first portions of each of said pair of side rail members are substantially parallel.

7. The module of claim 1, wherein each of said pair of tubular hydroformed first side rail members are defined by an outwardly deformed tubular metallic wall fixed into a predetermined exterior surface configuration.

* * * * *